(12) United States Patent
Wu et al.

(10) Patent No.: US 11,809,074 B2
(45) Date of Patent: Nov. 7, 2023

(54) SHUTTER

(71) Applicant: Lanto Electronic Limited, Kunshan (CN)

(72) Inventors: Fu-Yuan Wu, Taipei (TW); Shang-Yu Hsu, Taipei (TW); Yu-Huai Liao, Taipei (TW); Meng-Ting Lin, Taipei (TW)

(73) Assignee: LANTO ELECTRONIC LIMITED, Kunshan (CN)

( * ) Notice: Subject to any disclaimer, the term of this patent is extended or adjusted under 35 U.S.C. 154(b) by 0 days.

(21) Appl. No.: 17/889,780

(22) Filed: Aug. 17, 2022

(65) Prior Publication Data
US 2023/0071345 A1    Mar. 9, 2023

(30) Foreign Application Priority Data
Aug. 25, 2021    (CN) .............................. 202110980137

(51) Int. Cl.
*G03B 9/36*    (2021.01)
(52) U.S. Cl.
CPC ...................... *G03B 9/36* (2013.01)
(58) Field of Classification Search
CPC ....................................................... G03B 9/36
See application file for complete search history.

(56) References Cited

U.S. PATENT DOCUMENTS

| 2020/0177777 | A1* | 6/2020 | Imai ..................... G03B 11/043 |
| 2020/0249415 | A1* | 8/2020 | Wang ..................... G03B 30/00 |
| 2022/0091478 | A1* | 3/2022 | Sawanobori .......... G06F 1/1686 |
| 2022/0120997 | A1* | 4/2022 | Wang ..................... G02B 7/005 |
| 2022/0121086 | A1* | 4/2022 | Wang ..................... G03B 11/00 |
| 2023/0043065 | A1* | 2/2023 | Wang ..................... G03B 9/36 |

FOREIGN PATENT DOCUMENTS

| CN | 201477475 U | 5/2010 |
| CN | 108471009 A | 8/2018 |
| CN | 208479771 U | 2/2019 |
| CN | 110602353 A | 12/2019 |
| CN | 111756964 A | 10/2020 |
| CN | 112526799 A | 3/2021 |
| CN | 113259569 A | 8/2021 |
| JP | 2012-215697 A | 11/2012 |
| JP | 2019-8037 A | 1/2019 |
| TW | M610193 U | 4/2021 |
| TW | M614933 U | 7/2021 |
| WO | WO2019/117938 A1 | 6/2019 |

* cited by examiner

*Primary Examiner* — Clayton E. LaBalle
*Assistant Examiner* — Diana Hancock
(74) *Attorney, Agent, or Firm* — Birch, Stewart, Kolasch & Birch, LLP

(57) ABSTRACT

The present disclosure provides a shutter to expose or shut a camera, which comprises a base, a winding component, a shutting part, a first magnet, a buckling member, and a second magnet. Wherein, when the winding component forms a first magnetic field or the second magnetic field through a first current or a second current, the second magnet is driven to move the buckling member to be close to or away from the shutting part.

14 Claims, 11 Drawing Sheets

SHUTTER

CROSS-REFERENCE TO RELATED APPLICATION

This application claims the priority benefit of Chinese Patent Application Serial Number 202110980137.8, filed on Aug. 25, 2021, the full disclosure of which is incorporated herein by reference.

BACKGROUND

Technical Field

The present disclosure relates to the technical field of shutter, particularly to a shutter that can be automatically controlled.

Related Art

In conventional shutters, a shutting part can be automatically controlled to move to expose or to shut a specific component, such as a camera lens. With the development of optical component manufacturing process and miniaturization of electronic components and the demand for audio-visual sharing in these days, existing portable electronic products are equipped with at least one camera for photo capturing and a shutter that can be manually opened or closed.

However, the manual controlling is physically restricted by structural configuration and the assembly tightness is affected due to wearing between the components in long term use. When impacted by an external force, the shutting part of the shutter can be easy to deviate from the initial opening position or closing position.

Thus, to provide a shutter that can be automatically controlled to shut and expose and could avoid deviation of the shutting part when impacted by an external force becomes an issue to be solved.

SUMMARY

The embodiments of the present disclosure provide a shutter tended to solve the problem of conventional shutters that need to be opened and closed manually and the problem of shacking or deviation of the shutting part of the shutter when the conventional shutter is impacted by an external force.

The present disclosure provides a shutter, comprising a base, a winding component, a shutting part, a first magnet, a buckling member, and a second magnet. The base comprises a bottom part and an accommodating space. The winding component is disposed in the accommodating space. The shutting part is disposed in the accommodating space and corresponds to the winding part. The first magnet is disposed in the shutting part. The buckling member comprises a buckling end. The buckling end is disposed at a side edge of the winding component and buckles with the shutting part. The second magnet is disposed at the second buckling member. Wherein when a first current passes through the winding component to form a first magnetic field, the winding component drives the first magnet to move the shutting part along a first direction; when a second current passes through the winding component to form a second magnetic field, the winding component drives the first magnet to move the shutting part along a second direction. Wherein the first magnetic field and the second magnetic field drive the second magnet to allow the buckling member to be close to or away from the shutting part.

The shutter of the present disclosure further comprises a supporting elastomer disposed on the base. The supporting elastomer is configured to push the buckling member to couple the buckling end of the buckling member to be buckled with the shutting part. The shutting part comprises a shutting side, a magnetic side opposite to the shutting side, and a first recess opposite to the shutting side. The first magnet is disposed at the magnetic side. The first recess is adjacent to the magnetic side. When the first recess of the shutting part moves to an upper side of the buckling member and when the supporting elastomer pushes the buckling member upward to couple the buckling end of the buckling member to be close to the shutting part, the buckling end of the buckling member would be buckled with the first recess of the shutting part. Wherein the first magnetic field and the second magnetic field drive the second magnet to allow the buckling member to be away from the shutting part and to move the buckling end of the buckling member to be away from the first recess to release the buckling status of the shutting part.

In the shutter of the present disclosure, the shutting part comprises a second recess adjacently disposed at the shutting side. When the second recess of the shutting part moves to the upper side of the buckling member and when the supporting elastomer pushes the buckling member upward to couple the buckling end of the buckling member to be close to the shutting part, the buckling end of the buckling member is buckled with the second recess of the shutting part.

In the shutter of the present disclosure, the shutting part comprises a bump protrudingly disposed on a first surface of the shutting part facing the winding component. The first magnet is disposed in a slot of the bump.

In the shutter of the present disclosure, the buckling member further comprises a pushing end extending downward from the buckling end. The pushing end is disposed at a lower side of the winding component. The second magnet is disposed at the buckling end or the pushing end. The supporting elastomer is configured to push the pushing end upward.

The shutter of the present disclosure further comprises a third magnet, when the second magnet is disposed on one of the buckling end or the pushing end of the buckling member, the third magnet is disposed on the other one of the buckling end or the pushing end of the buckling member.

In the shutter of the present disclosure, the buckling member is a L-shaped buckling member. The buckling end is a long side of the L-shaped buckling member. The pushing end is a short side of the L-shaped buckling member.

In the shutter of the present disclosure, the winding component comprises a winding base, a magnetic conductive piece, a first pin, and a second pin. The winding base, a magnetic conductive piece, a first pin, and a second pin form an insert molding structural configuration.

In the shutter of the present disclosure, the first pin comprises a first winding end and a first lead-out end. The second pin comprises a second winding end and a second lead-out end. The first winding end and the second winding end are protrudingly disposed below the winding base and are parallelly arranged.

In the shutter of the present disclosure, the first lead-out end and the second lead-out end are protrudingly disposed below a side edge of the winding base and are parallelly arranged.

The shutter of the present disclosure further comprises a housing disposed above the base to house the shutting part, the winding component, and the base in order. The housing comprises an opening, a plurality of housing sidewalls, and a plurality of first connecting parts. The shutting side of the shutting part shields the opening. The plurality of housing sidewalls extending toward the base. The plurality of first connecting parts is disposed on a lower side of the plurality of housing sidewalls. The base comprises a plurality of second connecting parts corresponding to the plurality of first connecting parts.

In the shutter of the present disclosure, the plurality of second connecting parts are recessingly disposed at the bottom part of the base. The plurality of first connecting parts are protrudingly disposed on a lower surface of the housing sidewall in a downward direction. The plurality of first connecting parts respectively enter the corresponding plurality of second connecting parts. The lower surface of housing sidewall abuts against an upper surface of the bottom part.

In the shutter of the present disclosure, the plurality of first connecting parts of the housing are bonded to the plurality of second connecting parts of the base by a plurality of adhesive.

In the shutter of the present disclosure, the supporting elastomer is a U-shaped metal elastic piece. One end of the U-shaped metal elastic piece is connected to the bottom part of the base.

In the embodiments of the present disclosure, the automatic control is realized by magnetic attraction to control the movement and positioning of the shutting part along the horizontal direction to perform exposure and shutting and simplify the structural configuration and components used. Moreover, the buckling member could cooperate with the supporting elastomer to buckle the shutting part upward without any magnetic field to ensure the shutting part would not shake or deviate when the shutter is impacted by an external force.

It should be understood, however, that this summary may not contain all aspects and embodiments of the present disclosure, that this summary is not meant to be limiting or restrictive in any manner, and that the disclosure as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

The present disclosure will now be described more fully hereinafter with reference to the accompanying drawings, in which exemplary embodiments of the disclosure are shown. This present disclosure may, however, be embodied in many different forms and should not be construed as limited to the embodiments set forth herein. Rather, these embodiments are provided so that this present disclosure will be thorough and complete, and will fully convey the scope of the present disclosure to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the disclosure. This description is made for the purpose of illustration of the general principles of the disclosure and should not be taken in a limiting sense. The scope of the disclosure is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

Figure 1:
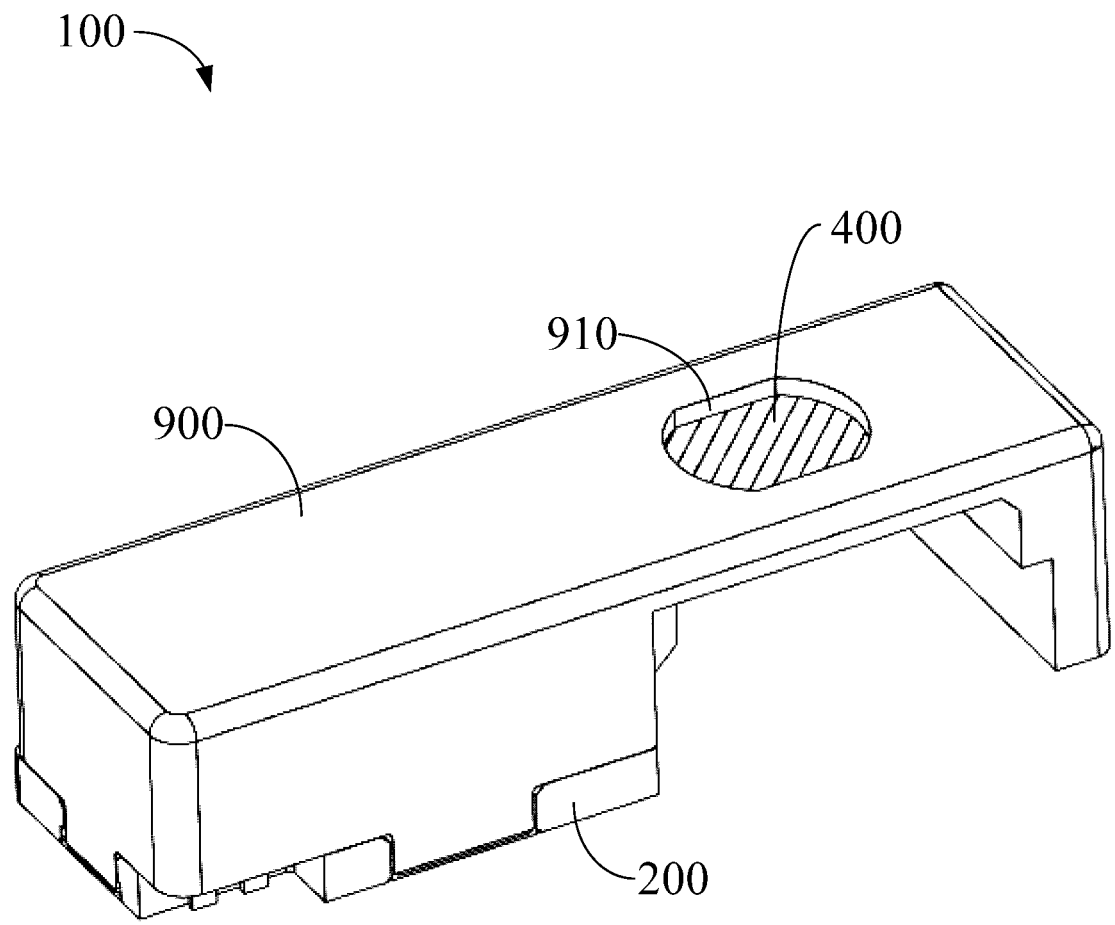
FIG. 1 is a perspective view showing a shutting part of a shutter of the present disclosure is closed.
Figure 2:
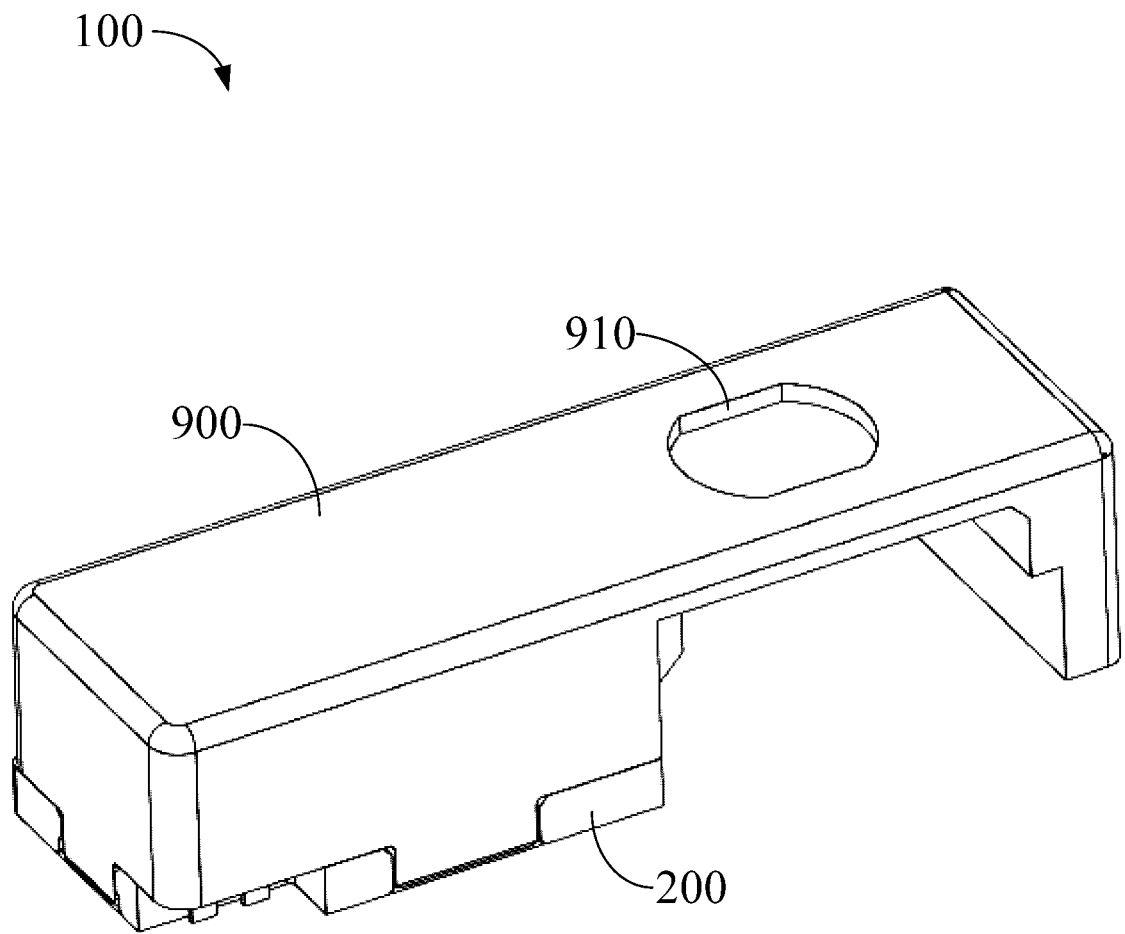
FIG. 2 is a perspective view showing the shutting part of the shutter of the present disclosure is opened.

As shown in FIG. 1, a shutting part 400 of a shutter 100 of the present disclosure could shut an opening 910 of a housing 900 when the shutter 100 is in a close state. As shown in FIG. 2, when the shutter 100 is in an open state, the shutting part 400 would move so that it could not cover the opening 910 of the housing 900. In some embodiments, the shutting part 400 could shut or expose a camera (not shown), for example, the shutting part 400 shuts the opening 910 of the housing 900 to further shut the camera to stop image shooting. When the shutting part 400 moves and no longer shuts the opening 910 of the housing 900, the camera would be exposed from the opening 910 of the housing 900, enabling image shooting.

Figure 3:
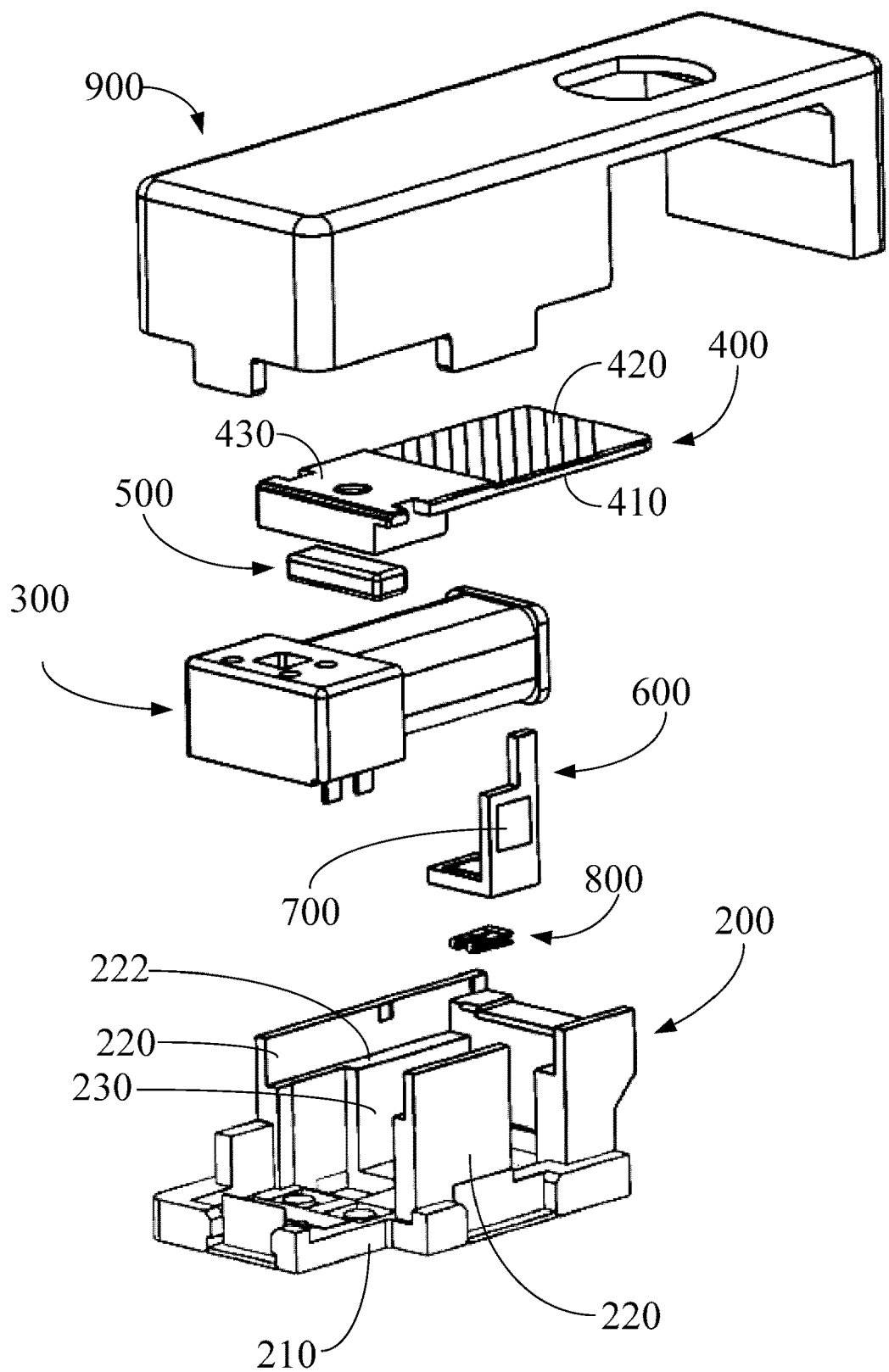
FIG. 3 is an exploded view of the shutter of the present disclosure.

FIG. 3 is an exploded view of the shutter 100 of the present disclosure. As shown in the figure, the shutter 100 comprises a base 200, a winding component 300, a shutting part 400, a first magnet 500, a buckling member 600, and a second magnet 700.

The base 200 comprises a bottom part 210 and two sidewalls 220 disposed on two side edges of the bottom part 210. The bottom part 210 and the two sidewalls 220 define an accommodating space 230. The winding component 300 is disposed in the accommodating space 230. The shutting part 400 is disposed in the accommodating space 230 and corresponds to the winding component 300. The first magnet 500 is disposed at a magnetic side 430 of the shutting part 400 and on a first surface 410 of the shutting part 400. The buckling member 600 comprises a buckling end 610, the buckling end 610 is disposed at a side edge of the winding component 300 and buckles the shutting part 400. The second magnet 700 is disposed at the buckling member 600.

According to the configuration above, when a first current passes the winding component 300 to form a first magnetic field, the first magnetic field would drive the first magnet 500 to move the shutting part 400 along a first direction and allows a shutting side 420 of the shutting part 400 to shut the camera; when a second current passes the winding component 300 to form a second magnetic field, the second magnetic field would drive the first magnet 500 to move the shutting part 400 along a second direction and allows the shutting side 420 of the shutting part 400 to move away from the camera to expose the camera. Moreover, the first magnetic field and the second magnetic field could also drive the second magnet 700 to move the buckling member 600 close to or away from the shutting part 400.

In other words, when the magnetic fields provided by the winding component 300 interact with the first magnet 500, the horizontal movement of the shutting part 400 can be controlled. The buckling member 600 could buckle the shutting part 400 upward to avoid the possible shaking or deviation of the shutting part 400 when the shutter 100 is impacted by an external force.

The shutter 100 further comprises a supporting elastomer 800 disposed at the base 200. The supporting elastomer 800 is configured to push the buckling member 600 to couple the buckling end 610 of the buckling member 600 to buckle the shutting part 400. The shutting part 400 comprises a shutting side 420, a magnetic side 430 opposite to the shutting side 420, and a first recess 440. The first magnet 500 is disposed at the magnetic side 430, and the first recess 440 is adjacent to the magnetic side 430. When the first recess 440 of the shutting part 400 moves to an upper side of the buckling member 600 and when the supporting elastomer 800 pushes the buckling member 600 upward to couple the buckling end 610 of the buckling member 600 to approach the shutting part 400, the buckling end 610 of the buckling member 600 would be buckled to the first recess 440 of the shutting part 400. The first magnetic field and the second magnetic field drive the second magnet 700 to keep the buckling member 600 away from the shielding part 400 and to couple the buckling end 610 of the buckling member 600 to be away from the first recess 440 to release the buckling of the shutting part 400.

Figure 4:
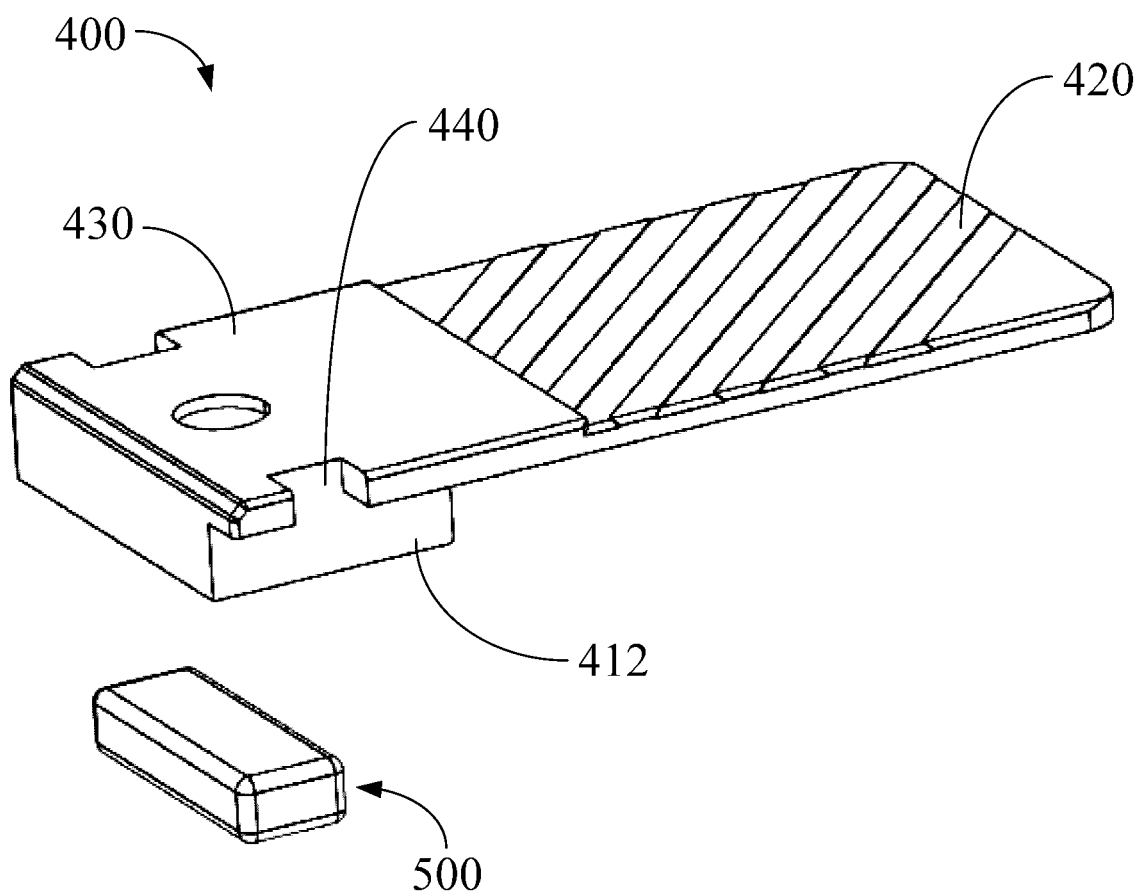
FIG. 4 is a perspective view of the shutting part and a first magnet of the shutter of the present disclosure.
Figure 5:
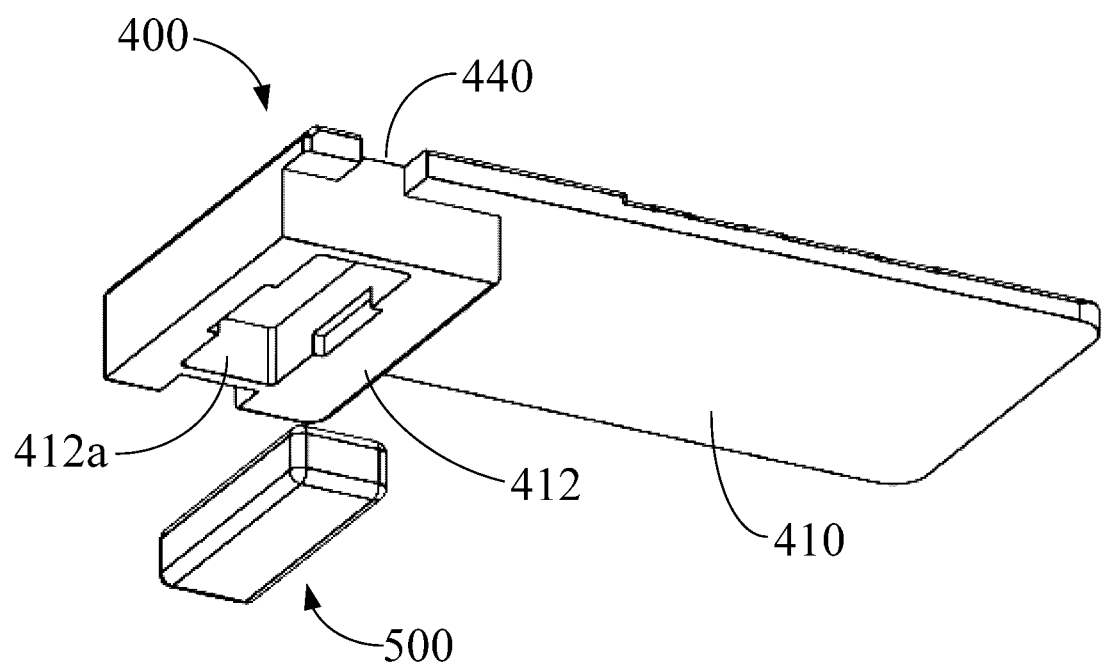
FIG. 5 is another perspective view of the shutting part and the first magnet of the shutter of the present disclosure.

Referring to FIG. 4 and FIG. 5, The shutting part 400 may comprise a bump 412 protrudingly disposed on the first surface 410 of the shutting part 400 facing the winding component 300. When the shutter 100 is assembled, the bump 412 would be disposed in the accommodating space 230 of the base 200, and the first magnet 500 would be disposed in a slot 412a of the bump 412.

According to the configuration above, neither the bump 412 of the shutting part 400 nor the first magnet 500 would directly contact the base 200 when the moving. In this way, the friction force that the shutting part 400 may be subjected to during the actuation process can be effectively reduced.

Furthermore, when the first magnet 500 is disposed in the slot 412a of the bump 412, the first magnet 500 would be secured in the slot 412a by gluing or embedding.

Figure 6:
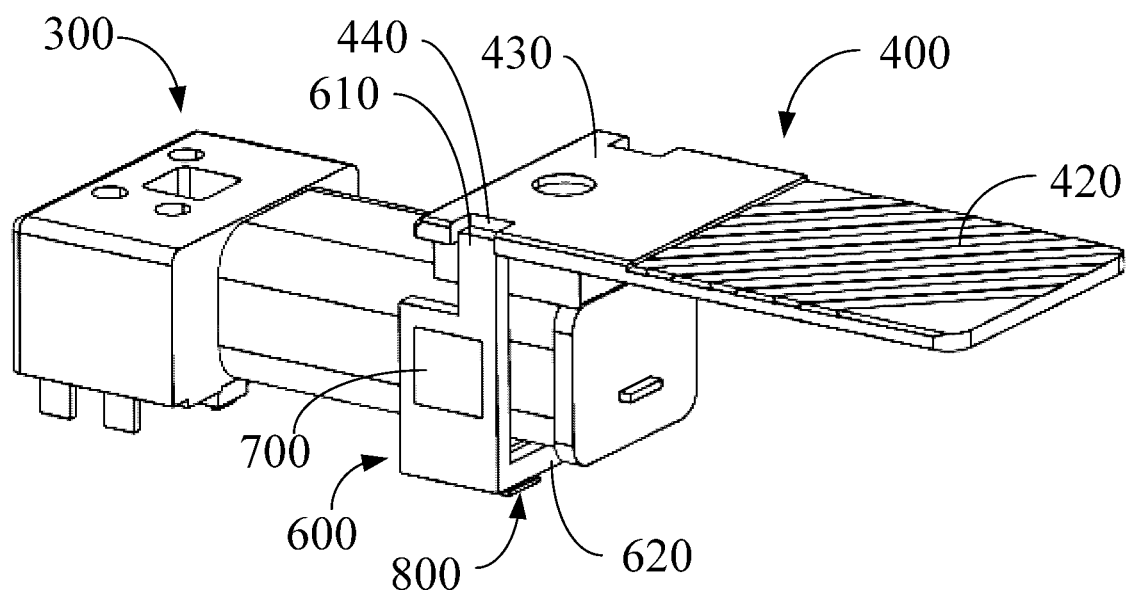
FIG. 6 is a schematic diagram showing the buckling member of the shutter of the present disclosure is supported by a supporting elastomer to buckle the shutting part.

As shown in FIG. 5 and FIG. 6, the shutting part 400 further comprises a first recess 440 adjacent to the magnetic side 430. When the first recess 440 of the shutting part 400 moves to the upper side of the buckling member 600 and when the supporting elastomer 800 pushes the pushing end 620 of the buckling member 600 upward to couple the buckling end 610 of the buckling member 600 to approach the shutting part 400, the buckling end 610 of the buckling member 600 would be buckled in the first recess 440 of the shutting part 400.

That is, as shown in FIG. 6, when the shutter 100 of the present disclosure shut the camera, the shutting side 420 of the shutting part 400 would move to a lower side of the opening 910 of the housing 900, and the first recess 440 of the shutting part 400 would move to the upper side of the buckling member 600 and is buckled with the buckling end 610 of the buckling member 600. Since the first recess 440 of the shutting part 400 comprises been buckled with the buckling end 610 of the buckling member 600, the possible shaking or deviation of the shutting part 400 could be effectively avoided when the shutter 100 is impacted by an external force.

On the other hand, the shutting part 400 may further comprise a second recess (not shown) adjacent to the shutting side 420 of the shutting part 400. When the second recess of the shutting part 400 moves to the upper side of the buckling member 600 and when the supporting elastomer 800 pushes the pushing end 620 of the buckling member 600 upward to couple the buckling end 610 of the buckling member 600 to approach the shutting part 400, the buckling end 610 of the buckling member 600 would be buckled in the second recess of the shutting part 400.

In other words, when the shutter 100 of the present disclosure exposes the camera, the shutting side 420 of the shutting part 400 would move in a direction away from the opening 910 of the housing 900, and the second recess of the shielding part 400 moves to the upper side of the buckling member 600 and is buckled with the buckling end 610 of the buckling member 600. Since the second recess of the shutting part 400 has been buckled with the buckling end 610 of the buckling member 600, the possible shaking or deviation of the shutting part 400 could be effectively avoided when the shutter 100 is impacted by an external force.

Figure 7:
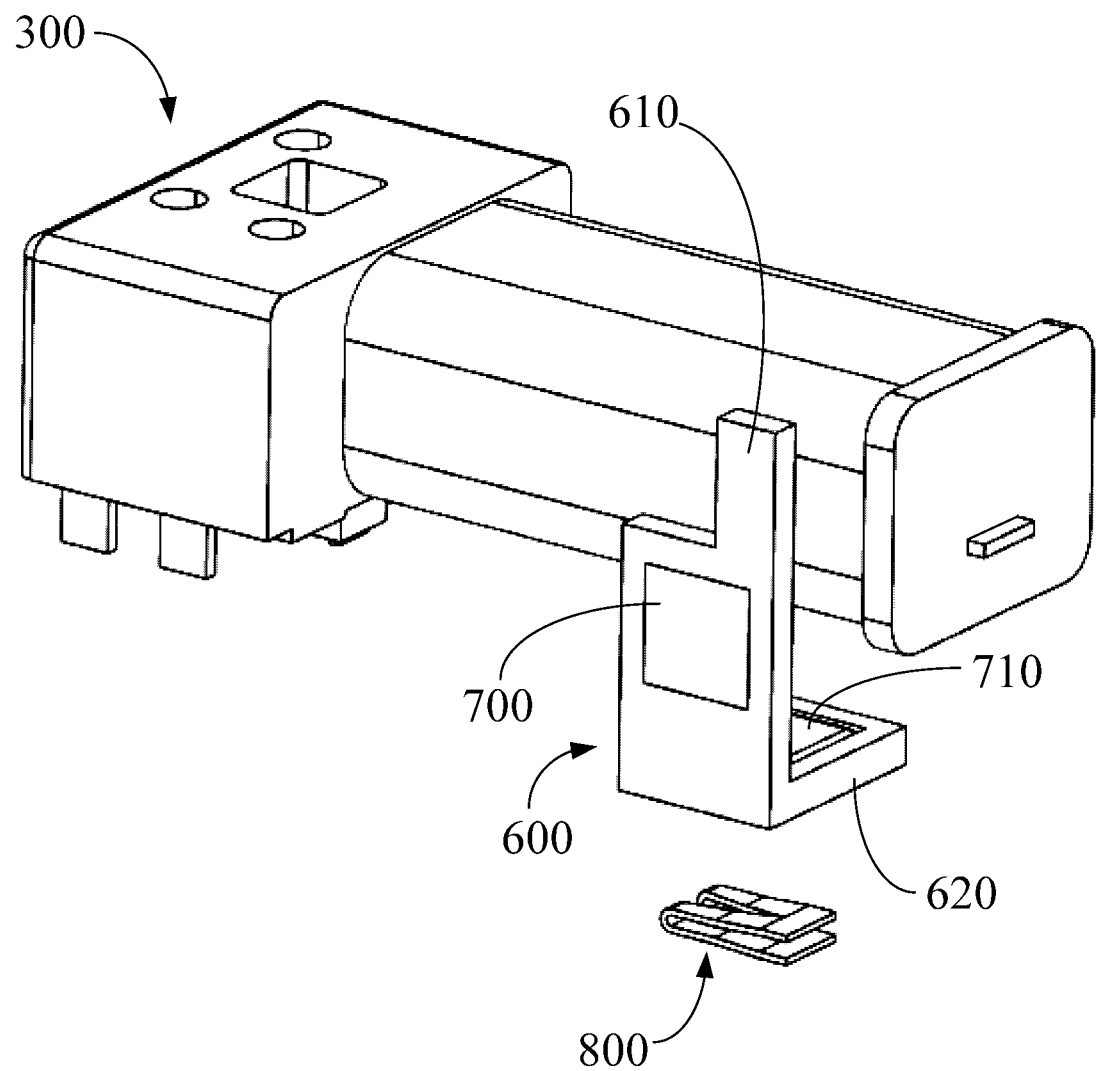
FIG. 7 is a schematic diagram showing the relative positions among a winding component, the buckling member, and the supporting elastomer of the shutter of the present disclosure.

As shown in FIG. 6 and FIG. 7, the buckling member 600 further comprises a pushing end 620 extending downward from the buckling end 610. The pushing end 620 is disposed on a lower side of the winding component 300, the second magnet 700 is disposed at the buckling end 610 or the pushing end 620, and the supporting elastomer 800 is configured to upwardly push the pushing end 620. That is, without any force applied, the supporting elastomer 800 would push upward against the pushing end 620 of the buckling member 600 to couple the buckling end 610 of the buckling member 600 to push the shutting part 400 upwardly.

As shown in the FIG. 7, the shutter 100 further comprises a third magnet 710. When the second magnet 700 is disposed at the buckling end 610 of the buckling member 600, the third magnet 710 could be disposed at the pushing end 620 of the buckling member 600. Alternatively, when the second magnet 700 is disposed at the pushing end 620 of the buckling member 600, the third magnet 710 could be disposed at the buckling end 610 of the buckling member 600. When the buckling member 600 is subjected to the first magnetic field and the second magnetic field, the third magnet 710 could accelerate the buckling member 600 to move away from the shutting part 400 and release the buckling of the shutting part 400.

In one embodiment, the buckling member 600 is L-shaped. The buckling end 610 is configured to be a long side of the L-shaped buckling member, and the pushing end 620 is configured to be a short side of the L-shaped buckling member to cooperate with the supporting elastomer 800 for optimal pushing effect, but it is not limited thereto. That is, the configuration of the buckling member 600 can be changed according to the appearance of the winding component 300 for optimal pushing effect.

Figure 11:
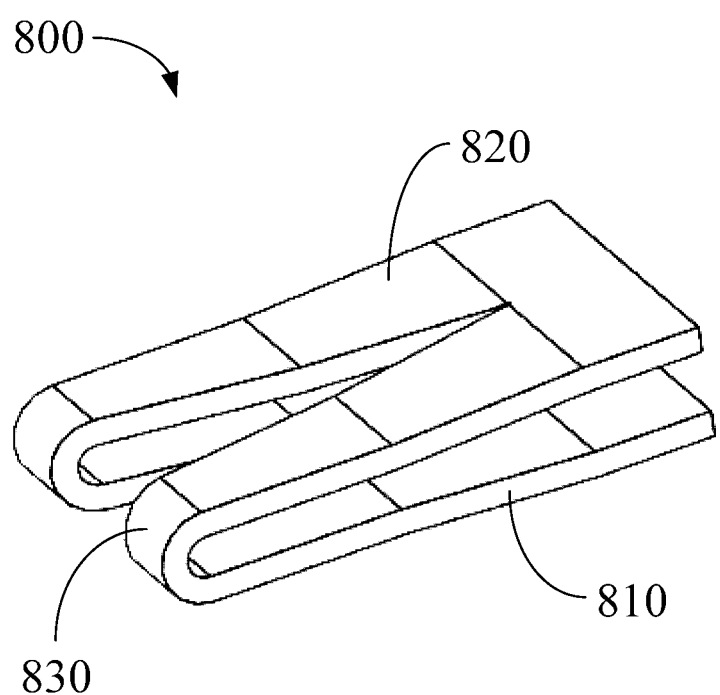
FIG. 11 is a schematic diagram of the supporting elastomer of the shutter of the present disclosure.

Besides, as shown in FIG. 11, the supporting elastomer 800 is preferably a U-shaped metal elastic sheet, one end of which is connected with the bottom part 210 of the base 200 so that the U-shaped metal elastic sheet can be disposed in a limited space between the pushing end 620 of the buckling member 600 and the base 200 to satisfy the demand for the miniaturization of the shutter 100. The supporting elastomer 800 comprises a first end part 810, a second end part 820, and a bending part 830. The bending part 830 is in connection with the first end part 810 and the second end part 820 and uses the limited space to provide proper force to enable the second end part 820 to push the pushing end 620 of the buckling member 600. In some embodiments, the first end part 810 is connected to the bottom part 210 of the base 200. For example, the first end part 810 can be secured to the bottom part 210 of the base 200 by insert molding.

Figure 8:
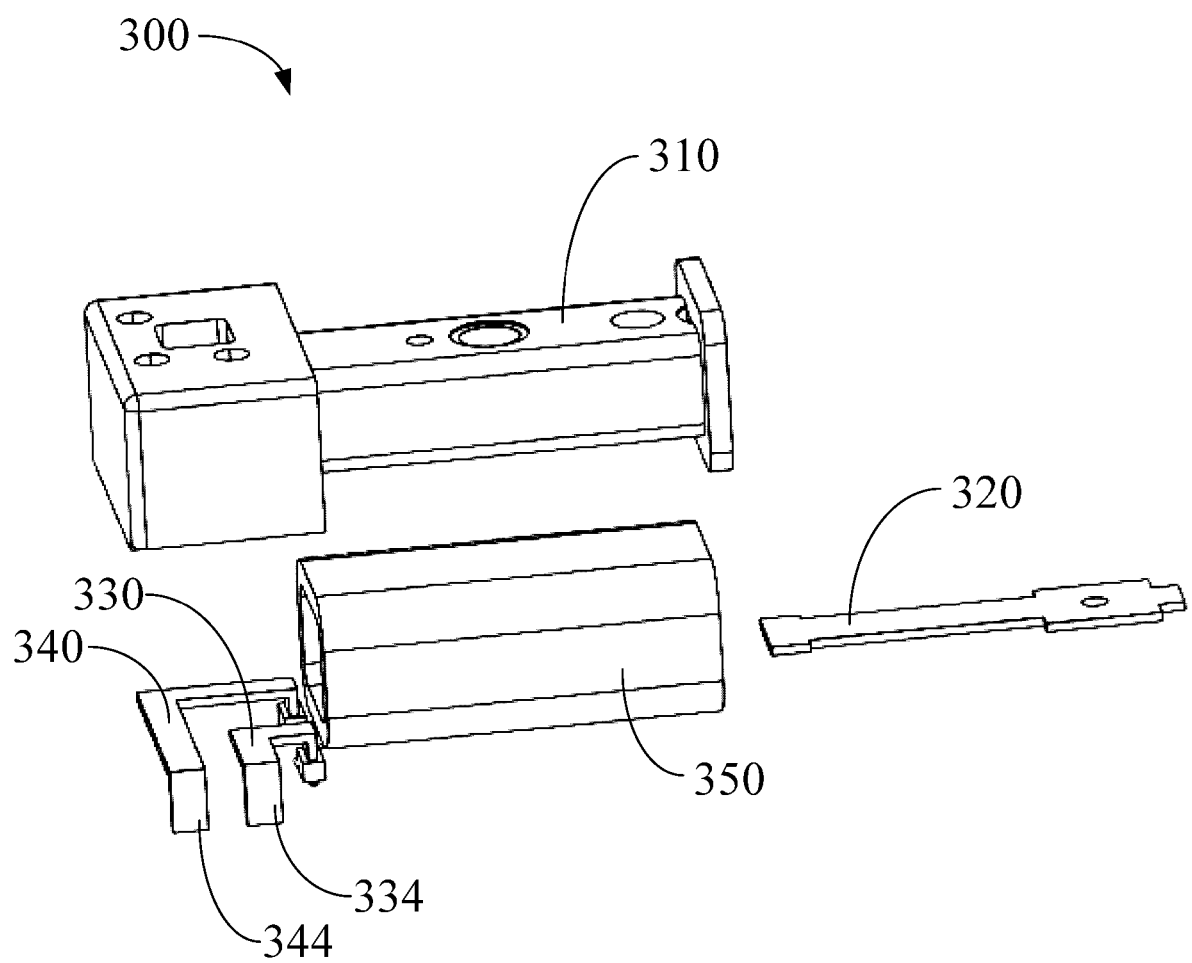
FIG. 8 is an exploded view of the winding component of the shutter of the present disclosure.
Figure 9:
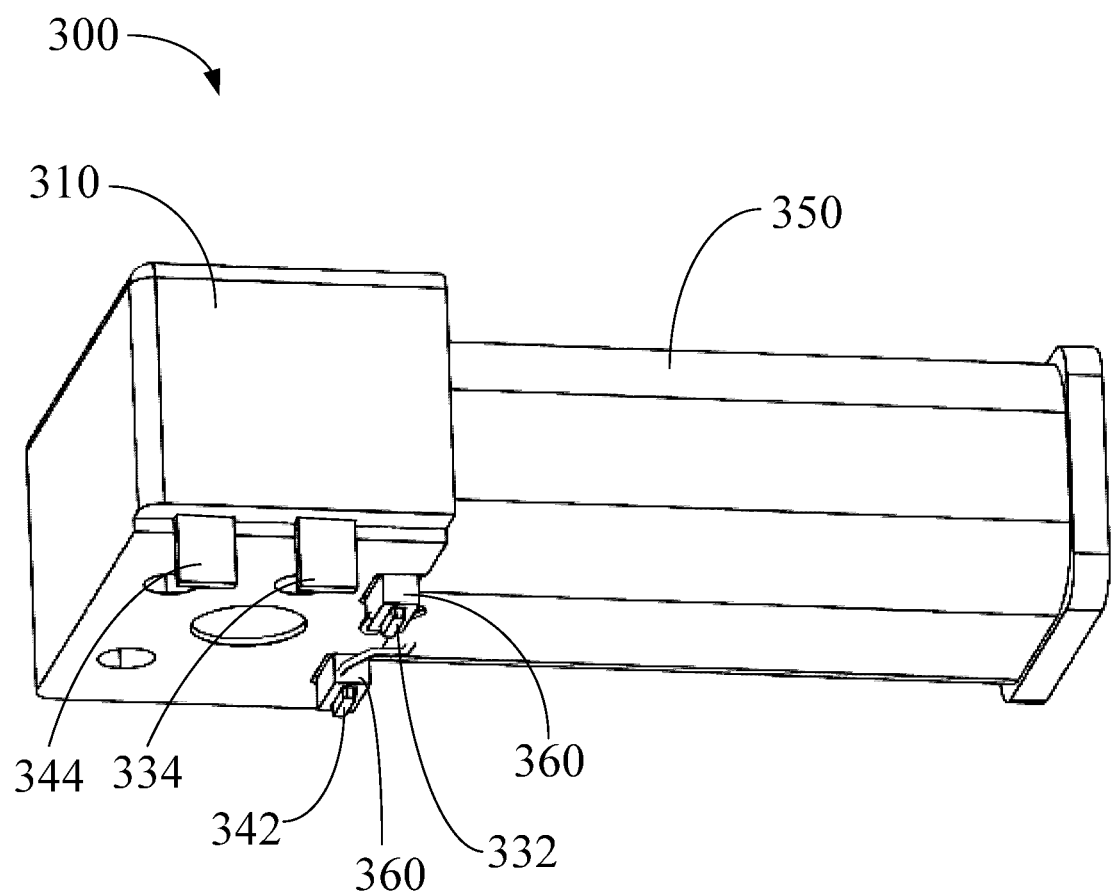
FIG. 9 is another schematic diagram of the winding component of the shutter of the present disclosure.

Referring to FIG. 8 and FIG. 9, the winding component 300 of the shutter 100 comprises a winding base 310, a magnetic conductive piece 320, a first pin 330, and a second pin 340. In the present disclosure, the winding base 310, the magnetic conductive piece 320, the first pin 330, and the second pin 340 are combined through insert molding. In some embodiments, the winding base 310, the magnetic conductive piece 320, the first pin 330, and the second pin 340 could also form an insert molding configuration, so that the magnetic conductive piece 320, the first pin 330, and the second pin 340 could be accommodated in the winding base 310 through a single molding step. Thus, The insert molding configuration formed by insert molding comprises the advantages of high assembly accuracy and high production efficiency.

As shown in the figures, the first pin 330 comprises a first winding end 332 and a first lead-out end 334, the second pin 340 comprises a second winding end 342 and a second lead-out end 344, and the first winding end 332 and the second winding end 342 are protrudingly disposed under the winding base 310 and are parallelly disposed for further winding operations. In some embodiments, when the above-mentioned insert molding steps are not started, the magnetic conductive piece 320 and the first pin 330 are formed by cutting and bending on one metal material, making the manufacturing process to be simplified. Alternatively, the magnetic conductive piece 320 and the second pin 340 are formed by cutting and bending on one piece of metal material, or the magnetic conductive piece 320, the first pin 330, and the second pin 340 are formed by cutting and bending on one piece of metal material.

Referring to FIG. 8 and FIG. 9 again, the winding component 300 further comprises a winding wire 350. The winding wire 350 can wind the first winding end 332, the winding base 310, and the second winding end 342 in the same order, and can also wind in an order of the second winding end 342, the winding base 310, and the winding end 332. In some embodiments, when the winding base 310, the magnetic conductive piece 320, the first pin 330, and the second pin 340 form an insert molding configuration through a single molding step, a wire could be winded on the insert molding configuration in an order by following a winding step to complete the production of the winding component 300 in a simple way. In some embodiments, the part of the winding wire 350 wound around the first winding end 332 is soldered and fixed to the first winding end 332. The part of the winding wire 350 wound around the second winding end 342 is soldered and fixed to the second winding end 342. In some embodiments, since the winding base 310, the magnetic conductive piece 320, the first pin 330, and the second pin 340 form a single insert molding configuration, it is more convenient to automatically wind the winding wire 350 on the first winding end 332, the winding base 310, and the second winding end 342 by an automatic winding apparatus.

In the present disclosure, the first lead-out end 334 of the first pin 330 and the second lead-out end 344 of the second pin 340 could further extend from the same side of the winding base 310 and be accommodated in a side recess of the bottom part 210. Since the first lead-out end 334 of the first pin 330 and the second lead-out end 344 of the second pin 340 extend from the same side and are disposed in parallel, the configuration of the winding component 300 can be more compact to reduce the overall size of the shutter 100 for a more suitable installation in conventional portable lightweight and thinned electronic products.

Referring to FIG. 9 again, when the winding wire 350 is wound around the first winding end 332 of the first pin 330 and the second winding end 342 of the second pin 340, two tin solders 360 can be respectively disposed on the first winding end 332 with the winding 350 and the second winding end 342 with the winding 350 to strengthen the bonding between the winding wire 350 and the first winding end 332 and the second winding end 342.

Figure 10:
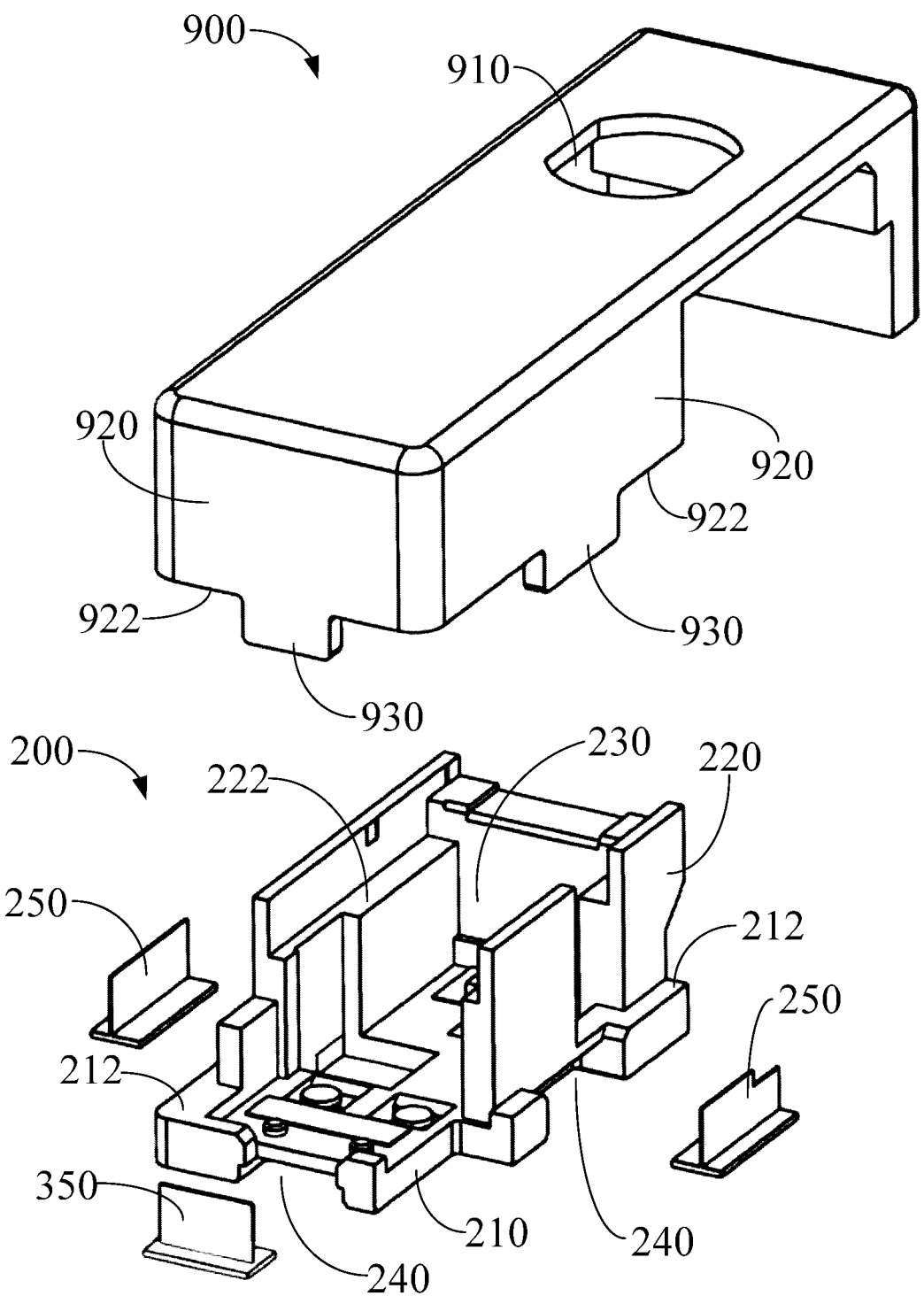
FIG. 10 is a schematic diagram showing the combination of a base of the shutter and a housing of the shutter of the present disclosure.

Referring to FIG. 3 and FIG. 10, the shutter 100 further comprises a housing 900. The housing 900 is disposed above the base 200 to cover the shutting part 400, the winding component 300, and the base 200 in order. The housing 900 comprises an opening 910, a plurality of housing sidewalls 920, and a plurality of first connecting parts 930. The shutting side 420 of the shutting part 400 shuts the opening 910. The plurality of housing sidewalls 920 extend toward the base 200. The plurality of first connecting parts 930 are disposed at a lower side of the plurality of housing sidewalls 920, and the base 200 comprises a plurality of second connecting parts 240 corresponding to the plurality of first connecting parts 930. In this way, when an improper force is applied and pressed to the shutter 100 of the present application, the force would be directly transmitted to the bottom part 210 of the base 200 via the housing sidewall 920 of the housing 900, so that the housing 900 would not deform by pressing to press the shutting part 400. Thus, the external force applied to the housing 900 could not affect the shutting part 400 therein, and the shutting part 400 could be prevented from being stuck at the winding component 300 due to the pressing.

As shown in FIG. 10, the plurality of second connecting parts 240 of the base 200 are recessingly disposed at the bottom part 210 of the base 200. The plurality of first connecting parts 930 are protrudingly disposed on a lower surface 922 of the housing sidewall 920 in a downward direction. The plurality of first connecting parts 930 respectively enter the corresponding plurality of second connecting parts 240. The lower surface 922 of the housing sidewall 920 abuts against an upper surface 212 of the bottom part 210. According to the above configuration, when the housing 900 is pressed or hit by an external force, the external force could be dispersed to the base 200 without compressing or affecting the shutting part 400 in the housing 900. In this way, the shutting part 400 can be prevented from being stuck at the winding component 300 due to pressure.

Moreover, the plurality of first connecting parts 930 of the housing 900 can be bonded to the plurality of second connecting parts 240 of the base 200 through a plurality of adhesive 250 to strengthen the securing between the housing 900 and the base 200 and to increase the durability when impacted by an external force.

In some embodiments, the base 200 comprises two sidewalls 220 disposed on two side edges of the bottom part 210. The housing sidewall 920 can be adjacent to the corresponding sidewall 220, so the applied pressure could also be transmitted to the sidewall 220 of the base 200. In this way, the sidewall 220 could support the housing sidewall 920 to prevent the housing sidewall 920 from being compressed and deformed.

Back to FIG. 5 and FIG. 6, since the first magnet 500 of the shutter 100 is disposed on the first surface 410 of the shutting part 400 (ie, the surface of the shutting part 400 facing the winding component 300), the magnetic conductive piece 20 disposed in the winding base 310 can be magnetically attracted to the first magnet 500. In this way, the positioning of the shutting part 400 in the vertical direction can be performed. For example, the magnetic attraction between the magnetic conductive piece 320 and the first magnet 500 would cause a certain degree of friction between the first surface 410 of the shutting part 400 and an upper side of the sidewall 220, and the magnetic field generated by the winding component 300 when an electric current is applied would generate a force that drives the first magnet 500 to move in the first direction or the second direction. When the force is greater than the maximum static friction force between the first surface 410 of the shutting part 400 and the upper side of the sidewall 220 away from the bottom part 210 due to magnetic attraction, the shutting part 400 can be moved. When no current is applied to the winding component 300, the magnetic attraction between the magnetic conductive piece 320 and the first magnet 500 could secure a relative position of the shutting part 400 and the sidewall 220. For example, when the shutting part 400 moves to a position where the shutting side 420 shuts the camera, the magnetic attraction between the magnetic conductive piece 320 and the first magnet 500 could keep the shutting side 420 at the position of where the camera is shut to prevent the shutting part 400 from moving due to external shaking or vibration. Meanwhile, through supporting the buckling member 600 by the supporting elastomer 800, the buckling end 610 of the buckling member 600 can be buckled with the first recess 440 of the shutting part 400 to completely restrict the movement of the shutting part 400. In this way, when the first current or the second current is not applied to the winding component 300, the winding component 300 would not form a magnetic field to drive the first magnet 500 to drive the shutting part 400 to move in the first direction or the second direction, nor the winding component 300 would form a magnetic field to drive the second magnet 700 to move the buckling member 600 away from the shutting part 400. The shutting part 400 is secured as the supporting elastomer 800 supports the buckling member 600. In this way, the possible shaking or deviation of the shutting part 400 can be avoided as the first current or the second current is not applied to the winding component 300.

In summary, embodiments of the present disclosure provide a shutter 100, whose automatic control is realized by magnetic attraction to control the movement and positioning of the shutting part 400 along the horizontal direction to perform exposure and shutting and simplify the structural configuration and components used. Besides, Through the magnetic attraction of the magnetic conductive piece 320 to the first magnet 500, the positioning of the shutting part 400 in a vertical direction can also be accurately completed. Moreover, the buckling member 600 could cooperate with the supporting elastomer 800 to effectively buckle the shutting part 400 to ensure the shutting part 400 would not shake or deviate when the winding component 300 is not applied with the first current or the second current.

It is to be understood that the term "comprises", "comprising", or any other variants thereof, is intended to encompass a non-exclusive inclusion, such that a process, method, article, or device of a series of elements not only comprise those elements but further comprises other elements that are not explicitly listed, or elements that are inherent to such a process, method, article, or device. An element defined by the phrase "comprising a . . . " does not exclude the presence of the same element in the process, method, article, or device that comprises the element.

Although the present disclosure has been explained in relation to its preferred embodiment, it does not intend to limit the present disclosure. It will be apparent to those skilled in the art having regard to this present disclosure that other modifications of the exemplary embodiments beyond those embodiments specifically described here may be made without departing from the spirit of the disclosure. Accordingly, such modifications are considered within the scope of the disclosure as limited solely by the appended claims.

What is claimed is:

1. A shutter, comprising:
   a base comprising a bottom part and an accommodating space;
   a winding component disposed in the accommodating space;
   a shutting part disposed in the accommodating space and corresponding to the winding part;
   a first magnet disposed in the shutting part;
   a buckling member comprising a buckling end, the buckling end being disposed at a side edge of the winding component and buckling with the shutting part; and
   a second magnet disposed at the buckling member;
   wherein the winding component is configured to drive the first magnet to move the shutting part along a first direction while a first current passes through the winding component to form a first magnetic field; the winding component is configured to drive the first magnet to move the shutting part along a second direction while a second current passes through the winding component to form a second magnetic field;
   wherein the first magnetic field and the second magnetic field drive the second magnet to allow the buckling member to be close to or away from the shutting part.

2. The shutter according to claim 1, further comprising a supporting elastomer, the supporting elastomer being disposed on the base, the supporting elastomer being configured to push the buckling member to couple the buckling end of the buckling member to be buckled with the shutting part, the shutting part comprising a shutting side, a magnetic side disposed opposite to the shutting side, and a first recess, the first magnet being disposed at the magnetic side, the first recess being adjacent to the magnetic side, wherein the buckling end of the buckling member is configured to be buckled with the first recess of the shutting part while the first recess of the shutting part moves to an upper side of the buckling member and the supporting elastomer pushes the buckling member upward to make the buckling end of the buckling member to be close to the shutting part; wherein the first magnetic field and the second magnetic field drive the second magnet to allow the buckling member to be away from the shutting part and to move the buckling end of the buckling member to be away from the first recess to release the shutting part.

3. The shutter according to claim 2, wherein the shutting part comprises a second recess adjacent to the shutting side; the buckling end of the buckling member is configured to be buckled with the second recess of the shutting part while the second recess of the shutting part moves to the upper side of the buckling member and the supporting elastomer pushes the buckling member upward to make the buckling end of the buckling member to be close to the shutting part.

4. The shutter according to claim 2, wherein the buckling member further comprises a pushing end extending downward from the buckling end; the pushing end is disposed at a lower side of the winding component; the second magnet is disposed at the buckling end or the pushing end; the supporting elastomer is configured to push the pushing end upward.

5. The shutter according to claim 4 comprising a third magnet, wherein while the second magnet is disposed on one of the buckling end and the pushing end of the buckling member, the third magnet is disposed on the other one of the buckling end and the pushing end of the buckling member.

6. The shutter according to claim 4, wherein the buckling member is a L-shaped buckling member; the buckling end is a long side of the L-shaped buckling member; the pushing end is a short side of the L-shaped buckling member.

7. The shutter according to claim 2, wherein the supporting elastomer is a U-shaped metal elastic piece; one end of the U-shaped metal elastic piece is connected to the bottom part of the base.

8. The shutter according to claim 1, wherein the shutting part comprises a bump protrudingly disposed on a first surface of the shutting part facing the winding component; the first magnet is disposed in a slot of the bump.

9. The shutter according to claim 1, wherein the winding component comprises a winding base, a magnetic conductive piece, a first pin, and a second pin; the winding base, the magnetic conductive piece, the first pin, and the second pin jointly form an insert molding structural configuration.

10. The shutter according to claim 9, wherein the first pin comprises a first winding end and a first lead-out end; the second pin comprises a second winding end and a second lead-out end; the first winding end and the second winding end are protrudingly disposed below the winding base and are parallelly arranged.

11. The shutter according to claim 10, wherein the first lead-out end and the second lead-out end are protrudingly disposed below a side edge of the winding base and are parallelly arranged.

12. The shutter according to claim 1, further comprising a housing disposed above the base to house the shutting part, the winding component, and the base in order, the housing comprising an opening, a plurality of housing sidewalls, and a plurality of first connecting parts, a shutting side of the shutting part is for shielding the opening, the plurality of housing sidewalls extending toward the base, the plurality of first connecting parts being disposed on a lower side of the plurality of housing sidewalls, the base comprising a plurality of second connecting parts corresponding to the plurality of first connecting parts.

13. The shutter according to claim 12, wherein the plurality of second connecting parts are recessingly disposed at the bottom part of the base; the plurality of first connecting parts are protrudingly disposed on a lower surface of the housing sidewall in a downward direction; the plurality of first connecting parts respectively enter the corresponding plurality of second connecting parts; the lower surface of housing sidewall abuts against an upper surface of the bottom part.

14. The shutter according to claim 13, wherein the plurality of first connecting parts of the housing are bonded to the plurality of second connecting parts of the base by a plurality of adhesive.

* * * * *